Patented Apr. 10, 1945

2,373,387

UNITED STATES PATENT OFFICE 2,373,387

TIN SOAPS AND PREPARATION THEREOF

Stanley B. Elliott, Cleveland, Ohio, assignor to The Harshaw Chemical Company, Elyria, Ohio, a corporation of Ohio No Drawing. Application March 5, 1941, Serial No. 381,853

5 Claims. (Cl. 260—414)

This invention relates to tin soaps and particularly to tin soaps of aliphatic and cyclo-aliphatic mono-carboxylic acids having boiling points above 175° C. and melting points not above 160° C.

One object of the invention is to provide an improved process of reacting such acids with stannous hydroxide to form such soaps, and a further object is to produce basic tin soaps of such acids, that is, soaps containing more combined tin than required by the formula $(RCOO)_2Sn$ and of any degree of basicity up to and even beyond such as represented by the formula $RCOOSnOH$.

Attempts to produce satisfactory tin soap compositions have been unsuccessful to a greater or less degree. If precipitation methods were employed, hydrolysis proved troublesome resulting in the presence of both tin hydroxide and free acid in the product. Presumably neutral tin soaps existed in equilibrium with these hydrolysis products but so far as I am aware the point was never proved inasmuch as separation would be difficult. If fusion methods were tried, the reaction failed to proceed or did not proceed to completion and so far as I know no successful fusion method has been developed heretofore.

So far as I am aware, no one has heretofore produced basic stannous soaps. These basic stannous soaps are useful as addition agents for lubricants and are superior to the neutral and acid soaps in that more metal can be introduced with less extraneous organic but with enough organic to insure proper dispersion in the lubricants, and at the same time, the introduction of acids capable of causing corrosion of engine parts is avoided. Considerable difficulty has been experienced also in avoiding the production of materials which are insoluble in lubricating oils or mineral spirits. These dark and oil-insoluble materials are believed to be stannic compounds or unreacted stannous oxide and some proposed methods of manufacture of the stannous soaps have included elaborate and expensive precautions to minimize the formation of these stannic compounds. It is important to avoid the presence of tin oxides in the product since they are abrasive.

I have now discovered that I am able to produce stannous soaps of those aliphatic and cyclo-aliphatic mono-carboxylic acids which have melting points not above 160° C. and boiling points above 175° C., such soaps being free from oil insoluble material and varying from neutral to fully basic, that is, varying between the limits of $(RCOO)_2Sn$ and $RCOOSnOH$. Indeed, I am able to produce tin soap compositions containing more tin than represented by the formula $RCOOSnOH$ and being oil soluble and free from uncombined tin hydroxide.

The products which I prefer to make might be empirically expressed by the formula $$xSn(OH)_2 \cdot Sn(OOCR)_2,$$ 

$x$ varying from 0.05 to 1.2. This mode of representation is adopted merely for convenience in defining the proportions or degree of basicity and is not proposed as a true formula. The usual representations for the neutral and fully basic salts are as shown above, namely, "$(RCOO)_2Sn$" and "$RCOOSnOH$." I believe that in the products which I produce the basicity is mainly accounted for by supposing that these products are mixtures of the neutral and fully basic compounds, the tin atom being bonded by one valency bond to the OH group and by the other valency bond to the RCOO group. Of the exact structure of these compositions I am not certain. I accomplish this result by heating the acid to a temperature above the decomposition temperature of $Sn(OH)_2$, which is about 160° C., and then adding the stannous hydroxide in moist condition. While I do not fully understand the reason, I have found that this procedure results in a ready reaction under conditions where the oxide would not react well and suppresses the formation of oil insoluble materials whether the product be neutral or basic.

I am able to produce soaps of aliphatic and cyclo-aliphatic mono-carboxylic acids having boiling points high enough to avoid excessive losses by volatilization at the reaction temperature selected but not too high for convenient operation. I prefer to make use of acids boiling at a temperature above 175° C. and for best results recommend acids having boiling points not lower than 225° C. It is also desirable that the acids employed have melting points not higher than 160° C. and preferably not above 75° C. Aliphatic and cyclo-aliphatic mono-carboxylic acids of from 10 to 24 carbon atoms in the molecule are most suitable and of these the compounds of from 15 to 18 carbon atoms are preferred.

The following acids may be mentioned by way of example as suitable for reaction with stannous hydroxide in accordance with my process, viz., oleic, stearic, palmitic, myristic, lauric, capric, and mixtures thereof, and acids and acid mixtures of the above indicated boiling and melting points obtained from petroleum (e. g., naphthenics), linseed oil, corn oil, soya bean oil, fish oil, tung oil, tall oil, and rosin. In the list of oils just recited, the acids obtained from petroleum (naphthenics), those obtained from the vegetable oils, from fish oils and from tung oil may be termed oil acids. The acid from tall oil, tall oil acids and the acids from rosin, rosin oil acids.

One or a mixture of the indicated acids may be elevated to a temperature not below 175° C. and preferably from 190° C. to 240° C. and moist hydrated stannous hydroxide added while maintaining the temperature. The stannous hydroxide should be added slowly and stirring may be desirable toward the end of the reaction. The amount of tin hydroxide added may be such as to produce a neutral soap of the formula $(RCOO)_2Sn$, but I prefer to use an amount to make basic soaps of approximately the empirical formula $xSn(OH)_2 \cdot Sn(OOCR)_2$ where $x$ varies from 0.05 to 1.2. In the case of compositions where $x$ is above 1.00, the reaction is difficult on account of the viscous nature of the reaction mixture as the end point is approached. The value of $x$ should be at least 0.05 so as to make a substantial improvement over the neutral composition and to make sure that production errors will never carry the value as low as neutral, thereby insuring absence of free acid. A very desirable range for the value of $x$ is therefore 0.05 to 1.0.

The water content (free water and water of hydration) of the tin hydroxide preferably is such that the elemental tin content of moist tin hydroxide material of the formula $Sn(OH)_2 \cdot xH_2O$ is from 25% to 60%, suitably from 30% to 45%.

The following specific examples will serve to illustrate the invention:

Example I

To 400 grams of oleic acid of acid value 190 at a temperature of 210° C. was added, while heating was continued, 221 grams of moist stannous hydrate (36.4% Sn, the remainder being OH and water, some of the water probably being chemically bound as water of hydration) at a rate to prevent substantial lowering of the temperature. The materials reacted readily and almost completely under these conditions to form a tin soap.

Example II

To 200 grams of naphthenic acid of acid value 263 at a temperature of 210° C. was added, while heating was continued, 153 grams of moist stannous hydrate (36.4% Sn, the remainder being OH and water, some of the water probably being chemically bound as water of hydration) at a rate to prevent substantial lowering of the temperature. The materials reacted readily yielding 200 grams of the tin soap.

Example III

Oleic acid, 800 grams, acid value 190, was brought to a temperature of approximately 210° C. and held between that temperature and 235° C. while 470 grams of moist stannous hydrate pulp was added slowly. The tin hydrate was freshly precipitated from cold stannous chloride by cold ammonia, filtered and washed with water and used with the moisture content resulting from such method of preparation (approximately 34% Sn). The yield was 95% of theoretical. The product was a clear, oily gel, approximately a neutral tin oleate (16% Sn).

This example was duplicated except that the tin hydrate was first dried over night at room temperature in a thin film. There was very little reaction and considerable quantities of gray to black insoluble materials were formed.

Example IV

To 40 grams of the neutral (16%) material produced according to Example III was added at a temperature maintained within the range 235° C. to 250° C. 10 grams more of the tin hydrate paste employed in making the 16% soap of Example III. The result was a basic tin soap (approximately 26% Sn).

Example V

To 900 grams of naphthenic acid of acid value 232 at a temperature of 210° C. to 225° C. was added 650 grams of the tin hydrate paste described in Example III. The product was a basic tin soap (24.2% Sn).

Example VI

Approximately 4½ pounds of oleic acid of acid value 195 were heated to 190° C. To this was added in small additions 2.4 pounds of moist stannous hydroxide (probably hydrated) containing 41% Sn (53% water). The temperature was maintained at 190° C. When all the tin hydrate had been added the material was analyzed and a further quantity of 0.55 pound of acid was added and reacted so as to make up for losses by volatilization. The result was 5.80 pounds of a neutral tin oleate containing 16.8% Sn. This material was a thin, tan colored liquid when warm (40° C. or higher) depositing about 25% of a pale, tan solid material (thought to be an isomer) on cooling to normal room temperature (21° C.).

Example VII

The procedure of Example VI was followed except that no acid was added to compensate for loss by volatilization. The result was 5.30 pounds of a basic tin oleate containing 18.4% Sn. This material was a thin, tan colored liquid when warm (40° C. or higher) depositing about 40% of a pale tan solid material on cooling to normal room temperature (21° C.).

Example VIII

Approximately 4½ pounds of naphthenic acid of acid value 232 was heated to 190° C. To this was added slowly 2.7 pounds of stannous hydroxide (probably hydrated) containing 41% Sn (53% water). The yield was 4.80 pounds of a basic tin naphthenate containing 22.8% Sn. This material was a dark, amber, viscous liquid at normal room temperature (21° C.).

Example IX

Starting with 300 grams of the product of Example VIII, additional tin hydroxide of the kind used in producing the composition of that example was cooked in at temperatures within the range 220° C. to 240° C. until the mass became as viscous as convenient to manipulate. The yield was 331 grams of a solid material of 38.3% tin content and soluble in lubricating oils, for example, a naphthenic base, 500 viscosity (100° F.), red oil.

Having thus described my invention, what I claim is:

1. A process for the production of basic tin soap compositions comprising reacting moist stannous hydroxide of the formula $Sn(OH)_2 \cdot H_2O$, whose elemental tin content is from 25% to 60%, with a monocarboxylic acid, having a boiling point above 175° C. and a melting point between 75° C. and 160° C., having from 10 to 24 carbon atoms to the molecule the batch being maintained at a temperature not below 175° C.

2. A process for the production of basic tin soap compositions comprising reacting moist stannous hydroxide of the formula $Sn(OH)_2 \cdot H_2O$, whose elemental tin content is from 25 to 60%, with a monocarboxylic acid, having a boiling point above 175° C. and a melting point between 160 and 175° C., having from 15 to 18 carbon atoms in the molecule, the temperature of the batch being maintained between 190° C. and 240° C.

3. A process for the production of tin soap compositions comprising reacting moist stannous hydroxide whose essential tin content is from 30% to 45% with a carboxylic acid mixture having boiling points above 175° C. and melting points between 75° C. and 160° C., the batch being maintained at a temperature not below 175° C.

4. A process for the production of tin soaps, comprising reacting moist hydrated, stannous hydroxide with an organic carboxylic acid mixture having boiling points above 175° C. and melting points between 100° C. and 175° C., having from 15 to 18 carbon atoms in the molecule, said moist stannous hydroxide having a moisture content such that the tin content is from 30% to 45%, the temperature of the batch being maintained between 190° C. and 240° C.

5. A process for the production of basic tin soap compositions comprising reacting moist stannous hydroxide of the formula $Sn(OH)_2H_2O$ whose elemental tin content is from 25% to 60% with an organic acid selected from the group consisting of naphthenic acids, tall oil acids and rosin acids, the batch being maintained at a temperature not below 175° C.

STANLEY B. ELLIOTT.